UNITED STATES PATENT OFFICE 2,501,406

METHOD OF STABILIZING DRIED STARCH SIRUP

Tore Nordenskjöld and Eric Axel Jönsson, Malmo, Sweden

No Drawing. Application September 11, 1946, Serial No. 696,382. In Sweden December 10, 1945

1 Claim. (Cl. 99—142)

The present invention relates to a method of stabilizing dried starch syrup. The starch syrup formed by the hydrolysis of starch and consisting of dextrose, maltose, dextrins and water in any proportions (possibly no maltose), is a free flowing to viscous solution, according to the water content, and is ordinarily marketed in barrels. It has found multiple use in the food production industry, and especially the confectionary industry.

It involves certain advantages to dry the starch syrup. Drying is advantageous partly because conveyance of the product obtained from the place of manufacture to the place of use will be more convenient and cheaper, and the product will be more easily handleable for incorporation in the manufacture of confectionery and other food products, and partly because the usefulness of the product in the food production industry, especially the confectionery industry, will be considerably increased. However, it has hitherto not been possible to any large extent to utilize these advantages owing to starch syrup, irrespective of what proportions of dextrose, maltose and dextrins it consists of, being extremely hygroscopic.

The principal object of the invention is to provide a method of making a dried starch syrup product which will be stabilized in its dry state, i. e. will no longer be hygroscopic, or in any case will have a very considerably diminished hygroscopicity.

In practising the invention, a dried starch syrup product having improved stability may be made by admixing vegetable or animal stabilizing agents with a body of starch syrup.

In a suitable form of the method, milk is used as the stabilizing agent. It is advantageous to add starch syrup to the milk and then dry the mixture in such a way that the different components of the starch syrup and the milk will remain unaltered as far as possible, the finished product being obtained in the form of a dry powder. Preferably, but not necessarily, the milk is pre-evaporated, before the starch syrup is added. It is also possible to add sugar, the sugar being added in the dry state to the dry product, or dissolved in milk before the drying process.

In another form of the method according to the invention, in which milk is also used as the stabilizing agent, the milk and the starch syrup are dried separately in such a way that the constituent elements of the substances of each remain unchanged as far as possible, after which the dried substances are mixed. Also in this form of the method the sugar may be added either by mixing it in the dry state with the dried product, or by dissolving it in milk before the drying process. The milk may suitably be pre-evaporated before it is dried.

Instead of milk also various dry vegetable substances may be used as the stabilizing agent, such as pectin, fruit seed flour (e. g. quince), starch or cellulose derivatives, among which may be mentioned methyl cellulose, Cellugel, Cellufix etc. The stabilized dried starch syrup may then be produced by dissolving one or more of the above-mentioned stabilizing agents in the starch syrup or in a certain amount of water, which in that case is thereafter added to the starch syrup, after which the mixture is dried in such a way that its constituent elements are altered as little as possible. When using starch as the stabilizing agent, it is also possible to convert it into paste before adding it. Possibly the starch syrup may first be dried, altering its constituent elements as little as possible, after which one or more of the above-mentioned stabilizing agents is admixed in the dry state.

Drying of the product and its stabilizing agent, in case the latter is initially hydrous, such as milk, is suitably effected by the so-called spray process, the hydrous product being sprayed into a drying tower and subjected to the action of a hot current of air which in a short time dries the product without deleteriously affecting its components.

The amount of stabilizing agent may vary within wide limits and is, of course, dependent upon the kind of stabilizing agent used.

Example

To 1000 litres of milk, pre-evaporated for removing some of the water, about 255 kilograms of starch syrup is added. The mixture is sprayed into a drying tower in which the drying takes place in the known manner. A dry powdery product is obtained in an amount of about 290 kilograms, of which about 180 kilograms is dried starch syrup and about 110 kilograms is powdered milk substance.

What we claim and desire to secure by Letters Patent is:

A method of manufacturing a dry, powdered starch syrup product, containing as its main ingredient a dried starch syrup composed to a major extent of dextrose and dextrins and made by the hydrolysis of starch, comprising mixing starch syrup and milk and spraying said mixture into a drying tower to convert said mixture directly into a dry powdered condition, and subjecting it to the action of a hot current of air to produce a dry powdered composition directly containing the various constituents of the solids of the starch syrup and the milk substantially unchanged, said final composition being substantially free from the tendency of dried starch syrup to absorb humidity.

TORE NORDENSKJÖLD.
ERIC AXEL JÖNSSON.

REFERENCES CITED

The following references are of record in the file of this patent:

UNITED STATES PATENTS

| Number | Name | Date |
|---|---|---|
| 2,332,513 | Heyman | Oct. 26, 1943 |